(12) United States Patent
Gradit

(10) Patent No.: US 9,613,315 B2
(45) Date of Patent: Apr. 4, 2017

(54) METHOD FOR PARTIAL LEARNING SHARING OF A SOFTWARE APPLICATION

(75) Inventor: Pierre Gradit, Blagnac (FR)

(73) Assignee: MEZZONOMY, Blagnac (FR)

( * ) Notice: Subject to any disclaimer, the term of this patent is extended or adjusted under 35 U.S.C. 154(b) by 369 days.

(21) Appl. No.: 13/990,978

(22) PCT Filed: Dec. 5, 2011

(86) PCT No.: PCT/EP2011/071770
§ 371 (c)(1),
(2), (4) Date: Jul. 30, 2013

(87) PCT Pub. No.: WO2012/076477
PCT Pub. Date: Jun. 14, 2012

(65) Prior Publication Data
US 2013/0304678 A1 Nov. 14, 2013

(30) Foreign Application Priority Data

Dec. 6, 2010 (FR) ..................................... 10 60125

(51) Int. Cl.
| | |
|---|---|
| *G06F 15/18* | (2006.01) |
| *G06N 99/00* | (2010.01) |
| *H04L 29/06* | (2006.01) |
| *G09B 5/02* | (2006.01) |
| *G09B 19/00* | (2006.01) |
| *G06F 3/14* | (2006.01) |

(52) U.S. Cl.
CPC ............ *G06N 99/005* (2013.01); *G09B 5/02* (2013.01); *G09B 19/0053* (2013.01); *H04L 67/38* (2013.01); *G06F 3/1454* (2013.01)

(58) Field of Classification Search
None
See application file for complete search history.

(56) References Cited

U.S. PATENT DOCUMENTS

| | | | |
|---|---|---|---|
| 2004/0024890 A1* | 2/2004 | Baek et al. ................... | 709/229 |
| 2006/0002315 A1 | 1/2006 | Theurer et al. | |
| 2007/0294626 A1* | 12/2007 | Fletcher et al. .............. | 715/751 |
| 2010/0257450 A1* | 10/2010 | Go et al. ....................... | 715/733 |

OTHER PUBLICATIONS

International Search Report dated, Feb. 22, 2012, from corresponding PCT application.

* cited by examiner

*Primary Examiner* — Paulinho E Smith
(74) *Attorney, Agent, or Firm* — Young & Thompson

(57) ABSTRACT

A method for sharing, by a secondary machine, an interactive region of a predefined application, executed on a primary machine to which the secondary machine is connected by a physical communications network, including learning a behavior, defining at the primary machine an interactive region to be shared, the interactive region being created within the application and not covering all of the application, exporting at the primary machine the interactive region to be shared to at least one secondary machine, and reproducing an interactive reflection of the interactive region on a secondary machine, the behavior of the interactive reflection being identical to that of the defined and exported interactive region such that identical inputs produce identical results.

10 Claims, 8 Drawing Sheets

Figure 1:
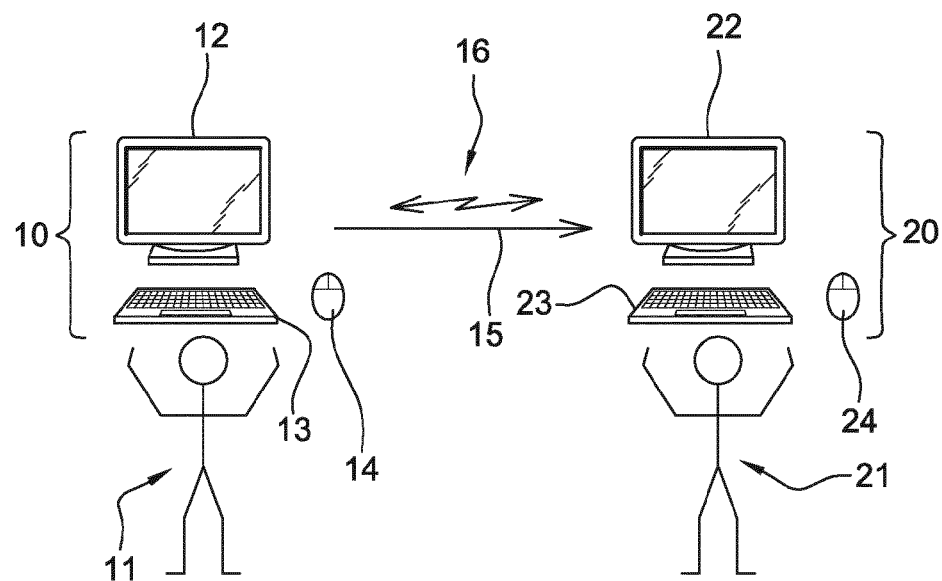

|    | A | B | C | D |
|---|---|---|---|---|
| 1 |  | Prix unitaire | Quantité |  |
| 2 | - |  |  |  |
| 3 | Installation de chaîne | 9,95 € |  |  |
| 4 | Crevaison | 7,95 € |  |  |
| 5 | Installation de fourche | 24,95 € |  |  |
| 6 | Poignées | 4,95 € | les deux |  |
| 7 | Leviers de freins | 9,95 € | les deux |  |
| 8 | Potence | 19,95 € |  |  |
| 9 | Guidon | 14,95 € |  |  |
| 10 | Tige de selle | 4,95 € |  |  |
| 11 | Pneu | 7,95 € | par pneu |  |
| 12 | Jeux de pédalier | 19,95 € |  |  |
| 13 | Guidoline | 7,95 € |  |  |
| 14 | Pédales | 4,95 € | les deux |  |
| 15 | Dérailleur | 14,95 € |  |  |
| 16 | Câbles | 14,95 € | câbles compris |  |
| 17 | Pignon | 9,95 € |  |  |
| 18 | Autres services | 45,00 € | tarif horaire |  |
| 19 |  |  |  |  |
| 20 |  | Prix unitaire | Quantité | Prix HT |
| 21 | - |  |  |  |
| 22 | - |  |  |  |
| 23 | - |  |  |  |
| 24 | - |  |  |  |
| 25 | - |  |  |  |
| 26 | - |  |  |  |
| 27 | - |  |  |  |
| 28 | - |  |  |  |
| 29 | - |  |  |  |
| 30 | - |  |  |  |
| 31 | - |  |  |  |
| 32 | - |  |  |  |
| 33 |  |  | Total HT |  |
| 34 |  |  | TVA |  |
| 35 |  |  | Total TTC |  |

Figure 3

$T\ (ref;\ Clip(Devis))\ =$

|   | A | B | C | D |
|---|---|---|---|---|
| 1 |   | Prix unitaire | Quantité |   |
| 2 |   |   |   |   |
| 3 | Installation de chaîne | 9,95 € |   |   |
| 4 | Crevaison | 7,95 € |   |   |
| 5 | Installation de fourche | 24,95 € |   |   |
| 6 | Poignées | 4,95 € | les deux |   |
| 7 | Leviers de freins | 9,95 € | les deux |   |
| 8 | Potence | 19,95 € |   |   |
| 9 | Guidon | 14,95 € |   |   |
| 10 | Tige de selle | 4,95 € |   |   |
| 11 | Pneu | 7,95 € | par pneu |   |
| 12 | Jeux de pédalier | 19,95 € |   |   |
| 13 | Guidoline | 7,95 € |   |   |
| 14 | Pédales | 4,95 € | les deux |   |
| 15 | Dérailleur | 14,95 € |   |   |
| 16 | Câbles | 14,95 € | câbles compris |   |
| 17 | Pignon | 9,95 € |   |   |
| 18 | Autres services | 45,00 € | tarif horaire |   |
| 19 |   |   |   |   |
| 20 |   | Prix unitaire | Quantité | Prix HT |
| 21 |   |   |   |   |
| 22 |   |   |   |   |
| 23 |   |   |   |   |
| 24 |   |   |   |   |
| 25 |   |   |   |   |
| 26 |   |   |   |   |
| 27 |   |   |   |   |
| 28 |   |   |   |   |
| 29 |   |   |   |   |
| 30 |   |   |   |   |
| 31 |   |   |   |   |
| 32 |   |   |   |   |
| 33 |   |   | Total HT |   |
| 34 |   |   | TVA |   |
| 35 |   |   | Total TTC |   |

Figure 4

|  | Prix unitaire | Quantité | Prix HT |
|---|---|---|---|
| =RECHERCHE(A21;A$2:A$18;B$2:B$18) | | 1 | 9,95 € |
| | | | |
| | | | |
| | | | |
| | | | |
| | | | |
| | | | |
| | | | |
| | | Total HT | 9,95 € |
| | | TVA | 1,95 € |
| | | Total TTC | 11,90 € |

Figure 8

METHOD FOR PARTIAL LEARNING
SHARING OF A SOFTWARE APPLICATION

This invention relates to the field of methods of learning. It relates more specifically a method for sharing, by a machine referred to as a secondary machine, an interactive region of a predefined application, executed on a machine referred to as a primary machine, to which it is connected by a physical communications network.

Preamble

The remote desktop or "export display" technique is already known in the field of application sharing. In this technique, a user of a secondary machine is connected to a primary machine and has a virtual desktop on this primary machine, computed on the primary machine. This desktop comprises applications executed on the primary machine, whose display is exported to the secondary machine. In this export display technique, the whole of each primary application considered is accessible to the secondary machine's user.

Similarly, techniques are known for remotely taking control of one machine by another machine, typically enabling application maintenance or system configuration operations (Telnet, SSH, etc.). Here, the remote user who takes control of the primary machine has access to all of the machine's applications, and also to all its files. The two techniques are used jointly, for example standard RFC1096 describes how to execute a display export from a Telnet session.

These two techniques do not allow the confidentiality of one part of an application to be maintained while giving access to another part of said application. In the case where the application was developed by a primary user through a long sequence of actions (which is the case when a complex worksheet is created on a spreadsheet application, for example), all the formulas and macros making up this complex worksheet become accessible to the remote user, even though it may be desirable to only give access to its use.

OBJECTIVES OF THE INVENTION

One aim of the invention is to allow one part of an application to be shared remotely, without giving full access to the application itself.

DESCRIPTION OF THE INVENTION

This invention envisages, according to a first aspect, a method for sharing, by a machine referred to as a secondary machine, a predefined application, said application being an "interactive regions" type as defined by W3C, said application being executed on a machine referred to as a primary machine, to which the secondary machine is connected by a physical communications network.

The method of shared learning comprises the following steps:

100—the primary user learning a behavior within the application considered, a step wherein a local behavior function $g_c$ on the primary machine is defined by the reaction to a sequence of any actions x1 whose elements are realized inside an interactive region of the application, this action sequence x1 leading to behavior $g_c$ being called learning the behavior $g_c$, 200—a user of the primary machine defining an action area C to be shared, said action area C being created within the interactive region and not covering all of said interactive region, 300—the primary user exporting the action area C to be shared from the primary machine to at least one secondary machine, 400—reproducing an interactive reflection $R_C$ of the action area C on a secondary machine, said interactive reflection $R_C$ presenting behavior identical to that of the defined and exported action area C, i.e. identical inputs in this action area C, referred to as stimulations, produce identical results.

Here the meaning of interactive region is as defined by W3C. An interactive region is therefore defined as a geometric region producing effects for all the interactive operations of the computer mouse and cursor: in particular picking, mouse-over and drag and drop. By default, the graphics primitives drawn for the object define the interactive region.

For the filled area primitives, the interactive region comprises: the edge, if edge visibility is "on"; the interior, if the interior style is other than "empty" or "hollow"; and the boundary, for interior style "hollow". For all types of graphics primitives, the graphics primitives drawn exclude those that are completely transparent (thus a completely transparent object is equivalent to an empty object, for the purposes of the definition of the interactive region).

According to a preferred implementation, in step 200, on a screen-type interface the primary user visually defines a closed border defining an action area C of the method, within the interactive region of the software application considered, running on the primary machine. More specifically, the action area C is defined by the data presentation graphics primitives on the display screen so as to form an interactive region included in the interactive region of the application considered, running on the primary machine.

According to an advantageous implementation, in step 300, the primary user commands behavior $g_c$ to be exported:

by clicking on the action area C to select it, the fact of clicking on a previously defined action area C, with a mouse type of interface, resulting in the address of behavior $g_c$ being placed in said mouse's registry, by dragging this action area C with the mouse outside the software application considered, so as to drop it in a message sent to a secondary user working on a secondary machine, this resulting in the address of behavior $g_c$ being transferred onto the exchange medium (15).

In this case, advantageously, when the address of behavior $g_c$ has been transmitted over the exchange network, it is retrieved by the secondary user in the registry of a mouse of the secondary machine, then dropped by the secondary user onto a software application executed on the secondary machine.

According to a preferred implementation, in step 400, for any stimulation y2 of the interactive reflection $R_C$ of an action area C by a user of a secondary machine, the reproduction of an interactive reflection $R_C$ comprises the following sub-steps:

401. the communications network transfers the stimulation y2 of the interactive reflection $R_C$ to the primary machine, said stimulation being performed on the secondary machine, 402. the application on the primary machine calculates the response to the stimulation y2 of the interactive reflection $R_C$, referred to as the secondary response, i.e. the calculation of the behavior function of reflection $R_C$ of the action area C is performed on the primary machine, 403. the secondary response is transferred to the secondary machine,

404. the interactive reflection $R_C$ is updated on the secondary machine.

For the expert, who would interpret this method in terms of inputs/outputs, this would consist of the following steps:
- on the secondary machine a secondary user selects input values to be executed by the calculation environment,
- the primary machine calculates the modification to the calculation environment, as a result of the selection of values to be executed,
- the result is transferred to the secondary machine and displayed in the reflection environment.

More specifically, in sub-step 402, the secondary response is defined by the graphic elements modifying the display of the interactive reflection $R_C$ of the action area C.

According to a preferred implementation for step 100, the learning can be transmitted to the primary machine without alphanumeric references used as variables. This absence ensures the absence, in the secondary interactive reflection, of such references taking their meaning in the primary context and that can be missing in the secondary context. These alphanumeric references used as variable are replaced in the preferred implementation for step 100 by graphic localizations on the action area C of the interactive region.

PRESENTATION OF THE FIGURES

The features and advantages of the invention will become apparent through the following description, which describes the characteristics of the invention in a non-limiting example of application.

Figure 2:
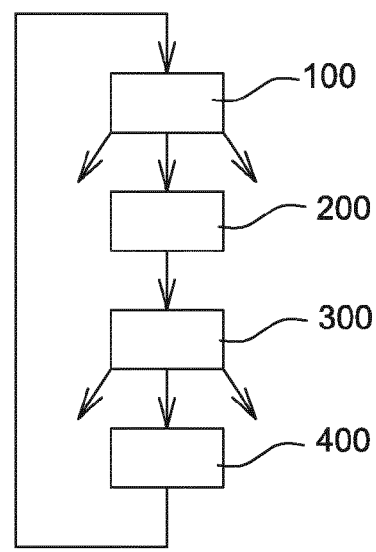
Figure 5:
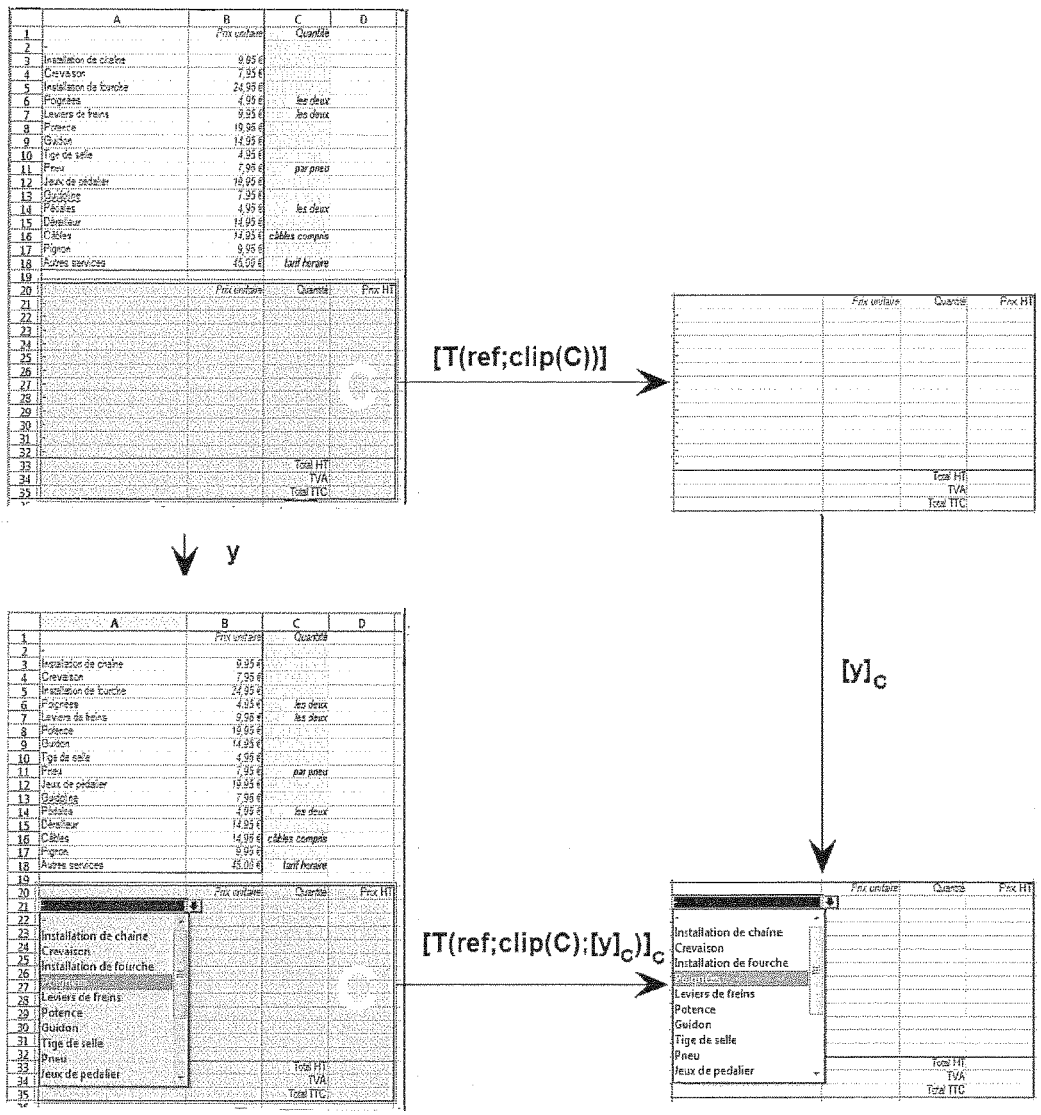
Figure 6:
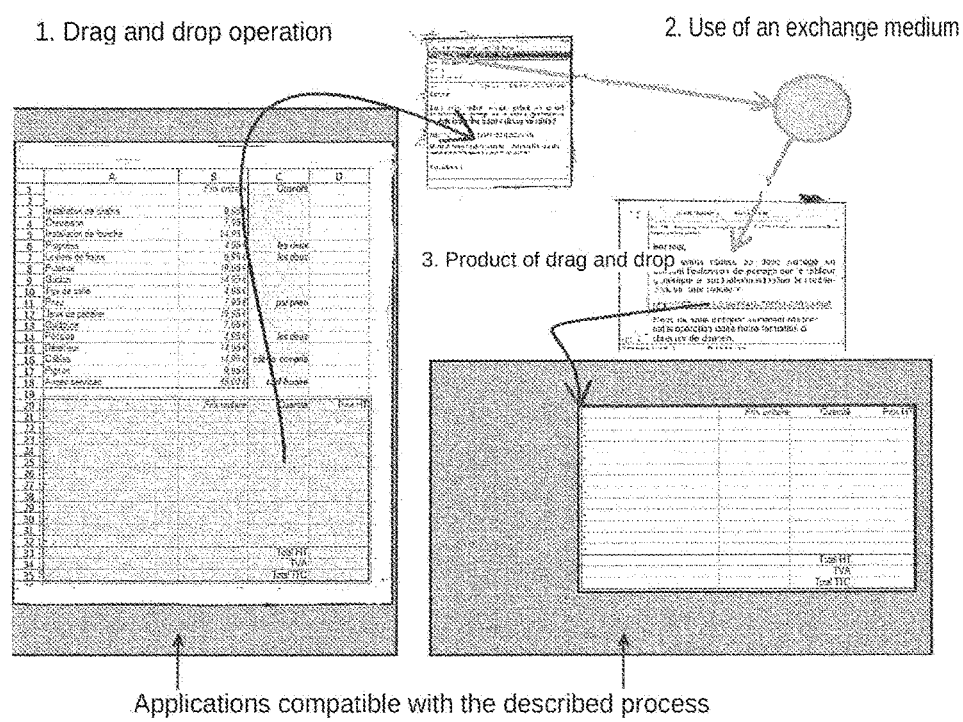
Figure 7:
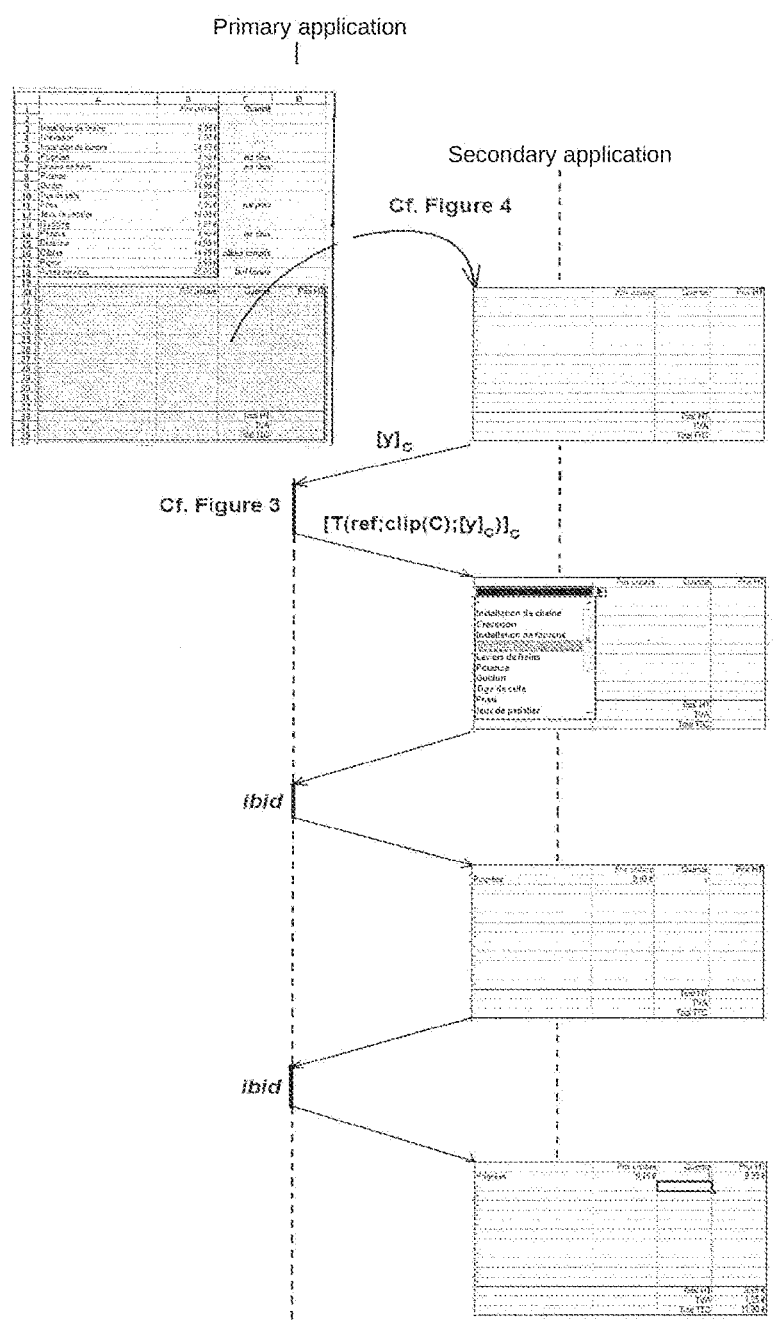
Figure 9:
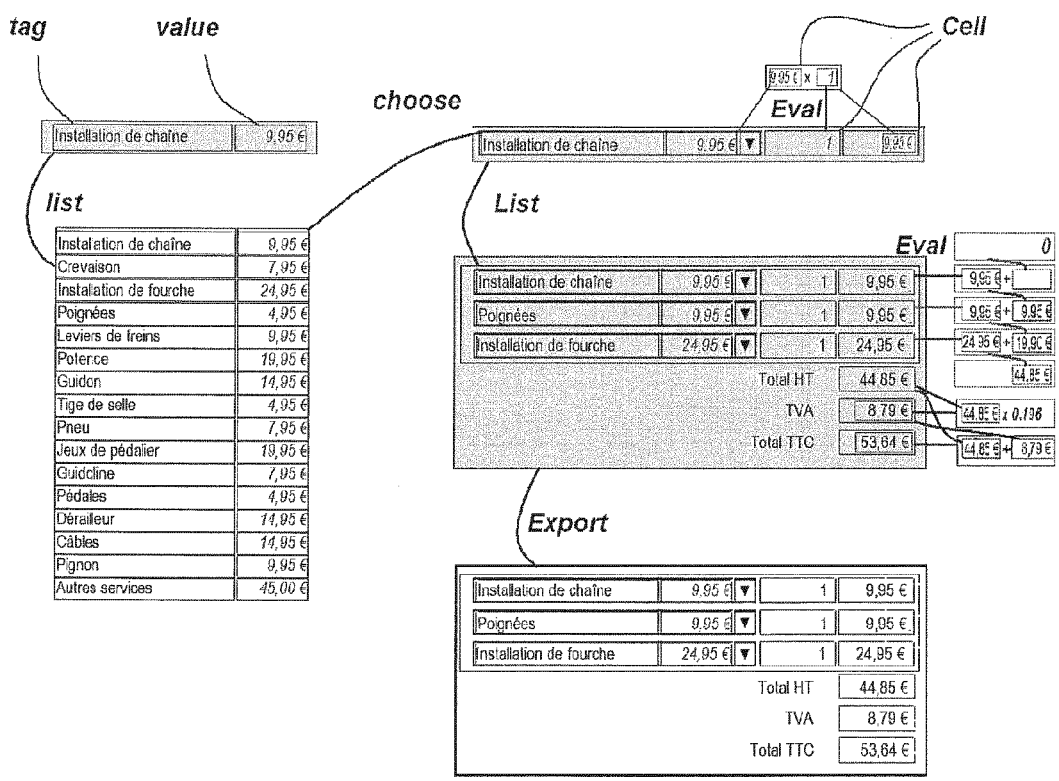

The description is based on the appended figures, which represent:

FIG. 1: a schematic diagram of elements involved in the method,

FIG. 2: a logic diagram of the steps of the method,

FIG. 3: an interface illustration of an application with an interactive region resulting from a learning process, FIG. 4: an illustration, for the same example as FIG. 3, of the definition of an action area of the method, FIG. 5: a schematic diagram illustrating the method applied on an area, FIG. 6: the main steps of the method of exporting an area by using an exchange medium, FIG. 7: the steps of remotely realizing the learning process, FIG. 8: an example of out-of-context behavior of the reflection of a generic spreadsheet application, FIG. 9: a secondary method without out-of-context behavior.

DETAILED DESCRIPTION OF AN EMBODIMENT OF THE INVENTION

The invention is a method of shared learning designed to be implemented in the form of software on microcomputer (personal computer) or central computer ("mainframe") types of computers, known per se.

In the mode of implementation described here as a non-limiting example (FIG. 1), a computer machine referred to as primary machine 10 is connected, by a physical network 16 supporting a communications protocol 15 of a type known per se, for example "internet protocol" (IP), to one or more computer machines referred to as secondary machines 20, 30, 40, . . . . A user, referred to as primary user 11, implements the method on the primary machine 10, and one or more users, referred to as secondary users 21, 31, 41 implementing the method on secondary machines 20, 30, 40 . . . .

Each of the primary and secondary machines (10, 20, 30, 40, etc.) implementing the method of sharing executes software elements performing the steps of said method of sharing.

The method of shared learning comprises several main steps (see FIG. 2):
- 100: learning a behavior,
- 200: defining an area,
- 300: exporting an area,
- 400: using the area.

Step 100: Learning a Behavior

A software application is considered, executed on the primary machine 10. This software application communicates with a primary user 11 via an interface, here assumed to comprise a screen type of graphic display 12, as well as a keyboard 13 and a computer mouse 14. In a variant, the display screen 12, the keyboard 13 and the computer mouse 14 can be advantageously replaced by a single Touchscreen. These elements are known per se and as such are outside the scope of this invention.

A sequence x1 of interactions of the primary user 11 of the interface is then noted. This action sequence x1 comprises in particular elements such as: moving the mouse 14 expressed, in a known way, by a movement of the pointer on the screen 12, pressing/releasing a button of the mouse 14 or the keyboard 13 etc. These elements comprising the action sequence x1 are the inputs of a processor of the primary machine 10. These actions take place within an interactive region of the application.

The interactive region's behavior can be described by the following equation:

$$d, u = f(x1) \tag{Eq. 1}$$

where:
- d designates the interface (i.e. a sequence of graphics elements, arranged in painter's order, i.e. in the order in which they were dropped on the screen 12),
- u is the registry of the mouse 14 (drag/drop . . . ),
- x1 is an action sequence
- f is a deterministic behavior function linked to the software application considered and running on the primary machine 10, It is important to note that we are interested in functions f with deterministic behavior, able to be learned, i.e. where the subsequent behavior is potentially influenced by the actions carried out earlier.

Thus: let f be a first behavior function, and x1 an action sequence on the primary actions 10. Any action sequence y following the first action sequence x1 defines a second deterministic behavior function $g_{x1}$ by the equation:

$$g_{x1}(y) = f(x1; y)$$

where x1; y defines the concatenation of sequences x1 and y.

Any sequence of interactions can, in effect, be perceived as the starting point of a behavior for a subsequent operation sequence. That the second deterministic behavior function $g_{x1}$ is significantly different from f is based on the learning ability nature of f. The following example details a learning process: a spreadsheet application is used to produce a services quote for a cycle retailer.

As a non-limiting application example of the method of sharing, a generic spreadsheet application T, which is a deterministic behavior function, in common use by the general public, is considered as software application, executed on the primary machine 10:

$$T = <<\text{the generic spreadsheet application}>>$$

After a sequence ref comprising a large number of key presses on the keyboard 13 and of movements of the mouse 14, the primary user 11 has constructed, as shown in FIG. 3, an interactive region with a suitable behavior for generating a services quote for a cycle retailer.

Step 200: Defining an Area

In the method of shared learning described here as a non-limiting example, one defines visually, on the screen 12 or any interface for reproducing data, as calculated by the software application running on the primary machine 10, closed borders (e.g. rectangle, bubbles, etc.) defining an action area of the method, in the software application considered. This action area is called a clip and designated C for the rest of the description.

In the example given here for explanatory purposes, the application considered is a spreadsheet dedicated to drawing up a service quote for a cycle dealer. In a cell of this spreadsheet, here referred to as function cell, the primary user 11 has entered a function whose result depends on the content of other cells in the spreadsheet, here referred to as data cells. The calculation and display of the result from calculating this function using the content of the data cells form a deduced behavior function of T. In FIG. 4, the bottom portion of the spreadsheet is identified as being the action area C of the method.

The primary user 11 defines an action area C enclosing various cells, here located at the bottom of the spreadsheet, this action area being highlighted in gray in FIG. 4. This definition of action area C is, for example, realized by a click-hold-drag movement of the mouse 14, transcribed on the screen 12 in the form of a rectangle drawn around the cells covered by the pointer. The elements that are going to define the action area C comprise all the data presentation graphics primitives on the display screen 12 so as to form an interactive region.

In the definition of the action area C as realized by the above method, the action area C thus defined remains highlighted for the primary user 11, for example by affixing a blue background over the entire surface of said action area.

This action area C thus defines a local behavior function $g_c$ on the primary machine 10 by the reaction to any action sequence whose elements are realized inside the action area. This local behavior function $g_c$ can be described by the equation:

$$g_c(y) = [f(x1; \text{clip}(C); [y])_C \quad \text{(Eq. 2)}$$

where y is any action sequence, and x1;clip(C);y defines the concatenation of sequences x1, clip(C) and y.

and $\sqcup_C$ defines the reduction of the graphic area at C. $[y]_C$ is any action sequence internal to the action area C, i.e. where all the elements are within the action area C, and $g_c$. the local behavior function at area C. $g_c$ is called behavior of area C; it is calculated on the primary machine 10 and x1 the action sequence leading to behavior $g_c$. The sequence: x1 is called learning behavior $g_c$.

It is understood that the definition of an action area C is reproduced at the start of each implementation of the method of defining a new behavior. On the other hand, depending on the objectives of the primary user 11, the sequence of learning x1 previous actions (defined in step 100) in the definition of the area C, and subsequent to behavior $g_c$, can differ from one user of the primary machine 10 to the next, or for the same primary user 10.

For the example already mentioned, FIG. 5 details the method of defining an action area:

$$\text{Quote}(y) = [T(\text{ref}; \text{clip}(C); [y]_C)]_C \quad \text{(Eq. 3)}$$

where y is any action sequence—additional use or learning.

and ref the operational sequence (or learning) allowing function T to learn the elements needed to represent a service quote for a cycle dealer.

and quote the behavior function allowing a service quote for a cycle dealer to be represented.

Step 300: Exporting an Area

'Exporting the area' means transferring the elements defining the action area C to a secondary machine, 20, in principle remote from the primary machine 10 on which the software application considered is executed.

The act of clicking, with the mouse 14, on a previously defined action area C, has the known result of placing the address of behavior $g_c$ in the registry of the mouse 14. This address of behavior $g_c$ can then be exchanged with a secondary machine 20 by any existing telematics means, used as exchange medium 15 using the physical network 16.

The primary user 11 commands the exporting of behavior $g_c$ by clicking on the previously defined action area C to select it, dragging this action area C outside the application software so as to drop it, for example, in an email sent to a secondary user 21 working on a secondary machine 20. This results in the address of behavior $g_c$ being transferred onto the exchange medium 15.

Once transmitted to the registry of the mouse 24 of a secondary machine 20, the secondary user 21 can drop this address in another application, compatible with the method described here. 'Compatible with the method of shared learning described in this application' means an application such that dropping the address generates the behavior defined in the following point.

FIG. 6 illustrates these steps of exporting from the action area C corresponding to the service quote for the cycle dealer, by means of a standard messaging application used as exchange medium 15.

Step 400: Using the Area

Dropping the address of behavior $g_c$ onto an application compatible with the method of shared learning described in this application, results in a reflection $R_{2C}$ of action area C, i.e. an area visually similar to action area C and whose behavior function is function $g_c$, appearing on the display screen 22 of the secondary machine 20.

A fundamental aspect of the method of shared learning described in this application is that calculation for the behavior function $g_c$ of the reflection $R_{2C}$ of the action area C is performed on the primary machine 10; the place where the action area C was first defined.

For this, the secondary machine 20, which is referred to as holder of reflection $R_{2C}$ of action area C, transmits all the actions y2 performed by the secondary user 21 in the area $R_{2C}$ to the primary machine 10. These actions y2 are defined by the movement of the cursor associated with the mouse 24 and by the alphanumeric elements entered by pressing keys of the keyboard 23 by the secondary user 21.

The primary machine 10 calculates the behavior $g_c$ associated to these actions y2, and sends the graphics primitives modifying the display of the action area C, resulting from these actions y2 of the secondary user 21, to the secondary machine 20. These graphics primitives are transferred to the secondary machine 20 through the physical network 16, and displayed in an update to the reflection $R_{2C}$ of action area C on the screen 22 of the secondary machine 20.

This procedure ensures the confidentiality of the learning x1 by the action area C, i.e. of the action sequence x1. In effect, the secondary user 21 has a means of operating actions y2 within action area C, without accessing the software application itself, or the actual definition of the behavior function $g_c$, and in particular without accessing the action sequence x1 or any representation of these actions other than the resulting behavior.

In addition, since the action area C is small in relation to the full software application, the secondary user 21 only has partial information about the behavior of the full application. This user only sees on his display screen 22 what the primary user 11 has decided to let him see, and only accesses the calculation results without accessing the underlying contributions to these results.

In the example already used earlier, the secondary user 21 can, in the context of an action sequence y2, supply new data in the data cells via his keyboard 23 and his mouse 24, and obtain on his display screen 22 a result displayed in the function cell, without however having access to the function, whose definition is contained in the function cell, stored on the primary machine 10.

In step with the n actions y2 of the secondary user 21 within the reflection $R_{2C}$ of the action area C, the primary machine 10 calculates the result of the behavior function $g_c$ applied to these actions y2 and sends back to the secondary machine 20 the resulting graphics primitives on the reflection $R_{2C}$ present on said secondary machine 20. The process continues while the reflection $R_{2C}$ is active, i.e. while the secondary user 20 produces actions y2 in the reflection $R_{2C}$.

Similarly, if several secondary users 21, 31, 41 are working simultaneously on reflections $R_{2C}$, $R_{3C}$, $R_{4C}$, the primary machine 10 calculates the result of the behavior function $g_c$ applied to these actions y2, y3, y4 and sends back to each secondary machine 20, 30, 40 the resulting graphics primitives on the reflection $R_{2C}$, $R_{3C}$, $R_{4C}$ present on these secondary machines 20, 30, 40.

In the non-limiting example described here, there can in principle be any number of secondary users 21, 31, 41, i.e. of reflections of the action area C, and this is only affected by the choice of the primary user 11.

In addition, the primary user 11 knows of all the secondary users 21, 31, 41. It is therefore possible to pool the secondary uses at the level of the primary machine 10. 'Pool' here means the fact that, in particular, if two secondary users 21, 31 follow the same sequence, i.e. ym=y2=y3, then the primary machine 10 only calculates the behavior function applied to this action sequence ym once, and sends the same graphics primitives back to the two secondary users 21 and 31 concerned.

The result of step 400 can be an element of step 100 of another method of shared learning.

Advantages of the Method

The method of shared learning as it has been described allows a software application to be made shareable as to its behavior by several secondary machines, without giving access to the application itself, which ensures a good level of confidentiality for the developments that led to the creation of this application, and also prevents it being unlawfully copied by an unscrupulous secondary user.

The aim of the method of shared learning described here is to transfer the behavior $g_c$ onto a secondary machine 20, while keeping the calculation of $g_c$ on the primary machine 10. This is achieved without moving the learning x1 of $g_c$, i.e. the action sequence x1 on the primary machine 10, used to define this behavior function $g_c$, to the secondary machine 20.

The prior state of the art does not mention any method for partial application sharing, wherein each user of the shared application only sees the result of his own stimulations, not that of the other users. On the contrary, in the prior state of the art, all the users share the same application, in the sense of creating a collaborative document where all the players follow a single common display.

The underlying problem of sharing the effects of a limited area of an application, without sharing the full application or its display on a primary machine, is in fact never mentioned in the prior state of the art.

In the application sharing methods of the prior state of the art, e.g. methods for remote machine control, an action on the secondary machine leads to a change to the display on the primary machine. In contrast, in this method, an action on the secondary machine, for example a change to parameters during partial sharing of a spreadsheet, does not change the data display on the primary machine in any way, but only on the screen of the secondary machine. This method is therefore quite different from sharing a collaborative type of session, in which each participant sees all the changes made by any of them.

In a traditional application sharing method, there is no difference in nature between the users of the primary and secondary machines.

In contrast, there is here only a functional sharing and only the interactive reflection is updated, the secondary user only having access to the local behavior function on the primary machine, not to its display on the primary machine's screen. Each secondary user can perform calculations on his machine using the same behavior function, without the other users knowing these calculations. In this method, a pointer to a function is transmitted. The actions executed by the user on the secondary machine do not affect the initial application.

In the sharing methods of the prior state of the art, in an arrangement with one primary machine and two secondary machines, situations of conflicts between users' instructions were possible. The conflicts were then managed by determining a circulation of write permissions between the users (for example of a circulating token type).

In this method, such conflict situations do not exist, conflicting instructions being able to be executed by different users simultaneously, each one only having an effect on his machine's display.

In other terms, one aim of the invention is to allow independent remote sharing of a functional portion of an application without changing its subsequent appearance on the primary machine, while it is used on the secondary machine.

The reflections on the primary and secondary machines are independent.

Embodiment Variants

The scope of this invention is not limited to the details of the forms of embodiment considered above as an example, but on the contrary extends to modifications in the reach of the expert.

This method of shared learning is applicable to any type of software application operating on interactive region principles, which is the case for all the interactive applications known to the inventors.

Secondary Method: Administering the Learning Sequence

Since one of the aims of the method is to uphold the learning locality, this learning remains confined to the primary machine.

Nevertheless, for reasons of performance or security of operation, it may be desirable to move this learning.

An application compatible with the method can therefore also provide an interface to an application able to carry out the administration of the learning.

The detail of the techniques involved in the actual realization of this secondary method is outside the framework of this invention.

Secondary Method: Behavior with No Out-of-Context Effect

If the implementation of the method is technically achievable on any application operating on the basis of interactive regions—namely almost all the current applications known to the inventors—this implementation is not always relevant for reasons inherent to the structure of the application.

In our use case—a spreadsheet allowing a quote to be drawn up for a cycle dealer—a double-click on a cell in the second column gives an out-of-context behavior, as illustrated by FIG. 8. "Out of context" means that the equation "=LOOKUP(A21;A$2:A$18;B$2:B$18)" gives references having no meaning in the context of the reflection for the holder of this reflection, here secondary user 21.

The secondary method described here consists of the presentation of a deterministic function capable of learning M allowing the user to use the method of shared learning that is the subject of this application, without out-of-context behavior. This function M is based on using drag-and-drop to perform the calculations.

FIG. 9 details a learning (action sequence x1 on the primary machine 10) entrusted to M, which leads to a behavior function comparable to that obtained at the end of the learning entrusted to T, whose final result is given in FIG. 3: a service quote for a cycle retailer.

The operational sequence x1 illustrated by FIG. 9 comprises, in the following order:

1. Dropping and editing a tag used as "description"
2. Dropping and editing a value used as "unit price"
3. Clipping the "description"/"unit price" pair
4. Creating and editing a list of reflections of the "description"/"unit price" clip
5. Dropping a choice taking its values from the list of reflections of the "description"/"unit price" clip
6. Dropping a value used as "quantity"
7. Dropping a value used as "price excl. tax"
8. Dropping a value used as "equation"
9. Dropping onto the value used as "equation" the value used as "unit price" in the choice: operation evaluating the value used as "unit price" and dropping the result in the value used as "equation".
10. Dropping onto the value used as "equation" the sign "*"
11. Dropping onto the value used as "equation" the value used as "quantity": operation evaluating the value used as "quantity" and dropping the result in the value used as "equation".
12. Dropping onto the value used as "equation" the value used as "price excl. tax": operation evaluating the value used as "equation" and dropping the result in the value used as "price excl. tax".
13. Clipping the "description"/"unit price" choice and values used as "quantity" and "price excl. tax": this clip is used as "quote line".
14. Creating and editing a list of reflections of the "quote line" clip.
15. Dropping the first value used as "price excl. tax" onto the background: operation creating a value list used as "partial sum" containing an evaluation for each value used as "price excl. tax".
16. Dropping onto the first value used as "partial sum" the sign "+"
17. Dropping onto the second value used as "partial sum" the first value used as "partial sum": operation creating the following elements,
    a value list used as "partial sum" containing an evaluation for each value used as "price excl. tax" added to the previous "partial sum"
    a first value initialized to 0
    a last value containing the evaluation of the "total sum"
18. Dropping a value used as "total price excl. tax"
19. Dropping a value used as "value added formula"
20. Dropping a value used as "value added tax"
21. Dropping a value used as "final price formula"
22. Dropping a value used as "total price incl. taxes"
23. Dropping onto the value used as "total price excl. tax" the value used as "total sum".
24. Dropping onto the value used as "value added formula" the value used as "total price excl. tax".
25. Dropping onto the value used as "value added formula" the signs "*", "0", ".", "1", "9", "6".
26. Dropping onto the value used as "value added tax" the value used as "value added formula".
27. Dropping onto the value used as "final price formula" the value used as "total price excl. tax".
28. Dropping onto the value used as "final price formula" the sign "+".
29. Dropping onto the value used as "final price formula" the value used as "value added tax".
30. Dropping onto the value used as "total price incl. taxes" the value used as "final price formula".

The above steps, numbered 1 to 30 detail a way of performing calculations that operate as references, such as those appearing in FIG. 8 in the form of addresses "=LOOKUP(A21;A$2:A$18;B$2:B$18)".

These alphanumeric references used as variables are replaced in this preferred implementation for step 100 by graphic localizations on the action area C of the interactive region. These references exist in the textual description, given above, of the activity represented in FIG. 9 ("price excl. tax" is such a reference), but this is a secondary effect of the description in text form, the need to identify the geographic localizations. The absence of these references in the secondary method M1, as it occurs in the operational reality of the primary user 10 and detailed graphically in FIG. 9, ensures structurally and decisively the absence of out-of-context behavior during the use of the method for partial shared learning described in this application. Use that is described below:

Clipping the list of "quote line" and values used as "total price excl. tax", "value added tax" and "total price incl. taxes": this clip is used as "quote"

Exporting the clip used as "quote" onto an exchange medium

The detail of the techniques involved in the actual realization of this secondary method is outside the framework of this invention.

The invention claimed is:

1. A method for sharing, to at least one secondary machine, features of a predefined application, said application being an interactive regions type as defined by W3C, said application being executed on a primary machine to which the secondary machine is connected by a physical communications network, the method comprising:

defining a local behavior function $g_c$ on the primary machine by reaction to an action sequence of actions x1 whose elements are realized inside an interactive region of the application, the action sequence x1 leading to the behavior $g_c$ and referred to as learning the behavior $g_c$;

at the primary machine, defining an action area C to be shared, said action area C being created within the interactive region and not covering all of said interactive region, the action defining behavior $g_c$ being able to be exchanged;

at the primary machine, exporting the action area C to be shared from the primary machine to the secondary machine; and reproducing an interactive reflection $R_{2C}$ of the action area C on the secondary machine, said interactive reflection $R_{2C}$ presenting behavior, including inputs to the action area C, identical to that of the defined and exported action area C, referred to as stimulations, and producing identical results at the secondary machine, the reproducing being such that, for each of a plurality of secondary users at a plurality of secondary machines working simultaneously on a plurality of reflections $R_{2C}$, $R_{3C}$, $R_{4C}$, the primary machine calculates the result of the behavior function $g_c$ applied to an action by any secondary user y2, y3, y4 upon any reflection at any secondary machine and sends back to each secondary machine (20, 30, 40) the resulting graphics primitives on the reflection $R_{2C}$, $R_{3C}$, $R_{4C}$ present on the secondary machines, said reflections $R_{2C}$, $R_{3C}$, $R_{4C}$ thus being potentially different from each other.

2. The method according to claim 1, wherein in the step of defining and action area, on a screen-type interface, representing in an interactive region data as calculated by the software application running on the primary machine, the primary user visually defines closed borders defining an action area C of the method, in the interactive region of the predefined application.

3. The method according to claim 2, wherein the action area C is defined by the data presentation graphics primitives on the display screen so as to form an interactive region.

4. The method according to claim 1, wherein, in the step of exporting the action area, the behavior $g_c$ is commanded to be exported by:

clicking on the action area C to select same, the clicking on a previously defined action area C, with a mouse type of interface, resulting in the address of behavior $g_c$ being placed in the registry of said mouse, and dragging the action area C with the mouse outside the software application considered, so as to drop the action area in a message sent to a secondary user working on the secondary machine, thereby resulting in the address of behavior $g_c$ being transferred onto the exchange medium.

5. The method according to claim 4, wherein, when the address of behavior $g_c$ has been transmitted over the exchange network, the address of behavior $g_c$ is retrieved by the secondary user in the registry of a mouse of the secondary machine, then dropped by the secondary user onto a software application executed on the secondary machine.

6. The method according to claim 1, wherein, in the step of reproducing an interactive reflection of the action area, for any stimulation y2 of the interactive reflection $R_{2C}$ of an action area C by a user of the secondary machine, the reproduction of an interactive reflection $R_{2C}$ comprises the following sub-steps:

the communications network transfers the stimulation y2 of the interactive reflection $R_{2C}$ to the primary machine, said stimulation being performed on the secondary machine, the application on the primary machine calculates the response to the stimulation y2 of the interactive reflection $R_{2C}$, referred to as the secondary response, i.e. the calculation of the behavior function of reflection $R_C$ of the action area C is performed on the primary machine, the secondary response is transferred to the secondary machine, and the interactive reflection $R_{2C}$ is updated on the secondary machine.

7. The method according to claim 6, wherein, in the sub-step of calculating the response to the stimulation of the interactive reflection, the secondary response is defined by the graphic elements modifying the display of the interactive reflection $R_{2C}$ of the action area C.

8. The method according to claim 1, wherein, in the step of defining a local behavior function, the learning can be transmitted to the primary machine without alphanumeric references used as variables so as to ensure the absence, in the secondary interactive reflection, of such references taking their meaning in the primary context.

9. A method for sharing, to at least one secondary machine, features of a predefined application, said application being an interactive regions type as defined by W3C, said application being executed on a primary machine to which the secondary machine is connected by a physical communications network, the method comprising:

defining a local behavior function $g_c$ on the primary machine by reaction to an action sequence of actions x1 whose elements are realized inside an interactive region of the application, the action sequence x1 leading to the behavior $g_c$ and referred to as learning the behavior $g_c$;

at the primary machine, defining an action area C to be shared, said action area C being created within the interactive region and not covering all of said interactive region, the action defining behavior $g_c$ being able to be exchanged;

at the primary machine, exporting the action area C to be shared from the primary machine to the secondary machine; and reproducing an interactive reflection $R_{2C}$ of the action area C on the secondary machine, said interactive reflection $R_{2C}$ presenting behavior, including inputs to the action area C, identical to that of the defined and exported action area C, referred to as stimulations, and producing identical results at the secondary machine, said reproducing step being such that, for each of a plurality of secondary users at a plurality of secondary machines working simultaneously on a plurality of reflections $R_{2C}$, $R_{3C}$, $R_{4C}$, each secondary user only having an effect on a reflection associated with said secondary user, the primary machine calculates the result of the behavior function gc applied to an action by any secondary user y2, y3, y4 upon any reflection at any secondary machine and sends back to each secondary machine (20, 30, 40) resulting graphics primitives on the reflection $R_{2C}$, $R_{3C}$, $R_{4C}$ present on the secondary machines, said reflections $R_{2C}$, $R_{3C}$, $R_{4C}$ thus being potentially different from each other.

10. A method for sharing, to at least one secondary machine, features of a predefined application, said application being an interactive regions type as defined by W3C, said application being executed on a primary machine to which the secondary machine is connected by a physical communications network, the method comprising:

defining a local behavior function $g_c$ on the primary machine by reaction to an action sequence of actions x1 whose elements are realized inside an interactive region of the application, the action sequence x1 leading to the behavior $g_c$ and referred to as learning the behavior $g_c$;

at the primary machine, defining an action area C to be shared, said action area C being created within the interactive region and not covering all of said interactive region, the action defining behavior $g_c$ being able to be exchanged;

at the primary machine, exporting the action area C to be shared from the primary machine to the secondary machine; and reproducing an interactive reflection $R_{2C}$ of the action area C on the secondary machine, said interactive reflection $R_{2C}$ presenting behavior, including inputs to the action area C, identical to that of the defined and exported action area C, referred to as stimulations, and producing identical results at the secondary machine, said reproducing step being such that, for each of a plurality of secondary users at a plurality of secondary machines working simultaneously on a plurality of reflections $R_{2C}$, $R_{3C}$, $R_{4C}$, the primary machine calculates the result of the behavior function $g_c$ applied to an action by any secondary user y2, y3, y4 upon any reflection at any secondary machine and sends back to each secondary machine (20, 30, 40) resulting graphics primitives on the reflection $R_{2C}$, $R_{3C}$, $R_{4C}$ present on the secondary machines, said reflections $R_{2C}$, $R_{3C}$, $R_{4C}$ thus being potentially different from each other in response to differences in the actions y2, y3, y4, performed by each of the secondary users (21, 31, 41).

\* \* \* \* \*